US012657047B2

(12) United States Patent
Powell et al.

(10) Patent No.: US 12,657,047 B2
(45) Date of Patent: Jun. 16, 2026

(54) LIFE CYCLE MANAGEMENT FOR DEVICE INPUT/OUTPUT INTERFACES IN VIRTUALIZED ENVIRONMENTS

(71) Applicant: ADVANCED MICRO DEVICES, INC., Santa Clara, CA (US)

(72) Inventors: Jeremy W. Powell, Austin, TX (US); David Kaplan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 447 days.

(21) Appl. No.: 18/090,790

(22) Filed: Dec. 29, 2022

(65) Prior Publication Data

US 2024/0220298 A1     Jul. 4, 2024

(51) Int. Cl.
*G06F 9/455* (2018.01)
*G06F 21/64* (2013.01)

(52) U.S. Cl.
CPC .......... *G06F 9/45558* (2013.01); *G06F 21/64* (2013.01); *G06F 2009/45579* (2013.01); *G06F 2009/45583* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 9,959,214 B1 | 5/2018 | Habusha et al. | |
| 12,254,337 B2 * | 3/2025 | Guim Bernat ........ | G06F 9/5077 |
| 2018/0241712 A1 | 8/2018 | Apfelbaum et al. | |
| 2020/0145419 A1 | 5/2020 | Yitbarek et al. | |
| 2020/0393977 A1 | 12/2020 | Alexandrovich et al. | |
| 2022/0027207 A1 | 1/2022 | Kakalya et al. | |

OTHER PUBLICATIONS

International Search Report and Written Opinion issued in Application No. PCT/US2023/085967, mailed May 3, 2024, 12 pages.
International Preliminary Report on Patentability mailed Jul. 10, 2025 for PCT/US2023/085967, 8 pages.

* cited by examiner

*Primary Examiner* — Charlie Sun

(57) ABSTRACT

A security module of a processor manages the lifecycle of device interfaces of input/output (I/O) devices within a virtualization environment in a secure and trusted manner. For example, the security module is configured to bind a device interface of an I/O device interface to a virtual machine (VM). Responsive to the device interface being bound, the security module is configured to attest at least one of the device interface and the I/O device. Responsive to the at least one of the device interface or the I/O device being attested, the security module is configured to configure an input-output memory management unit (IOMMU) and memory resources associated with the VM.

24 Claims, 3 Drawing Sheets

LIFE CYCLE MANAGEMENT FOR DEVICE INPUT/OUTPUT INTERFACES IN VIRTUALIZED ENVIRONMENTS

BACKGROUND

In a confidential computing environment, a processing system (e.g., a server) executes multiple software programs, such as virtual machines (VMs) and a virtual machine manager (e.g., a hypervisor), wherein different software programs are owned by different entities. For example, in some confidential computing environments, different virtual machines executed by the environment are owned by different companies. A virtual machine manager (e.g., a hypervisor) controls the assignment of environment resources to different virtual machines and provides an interface between the virtual machines and the server hardware, so that each VM is able to operate as if that VM were executing on its own dedicated hardware.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
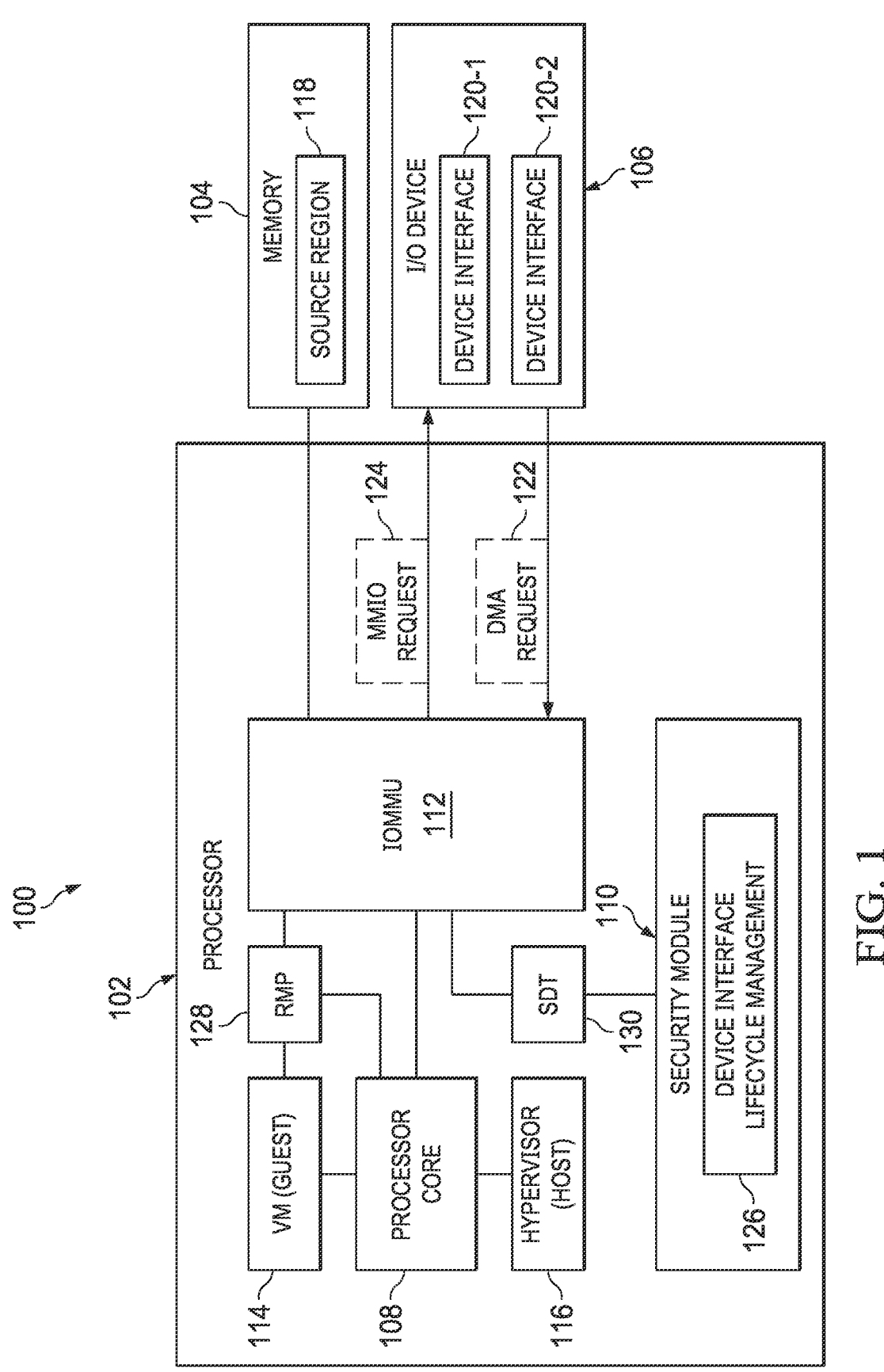
FIG. 1 is a block diagram of a processing system that employs a security module for managing a lifecycle of device interfaces of input/output devices in a virtualization environment in accordance with some embodiments.

Confidential computing environments implement various security features to protect VMs from malicious attacks by untrusted devices or components. For example, security features can be implemented by the virtual machine manager that prevent one VM from accessing the data (or other information) associated with another VM. This approach typically considers a virtual machine manager to be a trusted component and does not isolate the virtual machine manager from the VMs. However, in many confidential computing environments, VMs can benefit from a VM trust model in which the virtual machine manager is considered an untrusted component to protect the VMs from a malicious virtual machine manager accessing confidential information of a given VM. For example, in a computing environment, such as a cloud-based computing environment, an entity may want to secure its VM-based workloads from the cloud administrator to keep their data confidential and minimize their exposure to bugs in the cloud provider's infrastructure. Therefore, some confidential computing environments implement security features that isolate VMs at a hardware level from the virtual machine manager and other code that may happen to coexist on the physical server. For example, individual VMs are assigned a unique Advanced Encryption Standard (AES) encryption key that is used to automatically encrypt the in-use data of each VM. When a component, such as the virtual machine manager, attempts to read memory inside a VM, the component is only able to see the encrypted bytes. In another example, the VM register state is encrypted on each virtual machine manager transition so that the virtual machine manager cannot see the data actively being used by the VM. In yet a further example, integrity of a VM is protected by introducing a Reverse Map Table (RMP) to record and check the ownership of the VM's memory pages. If a VM is able to read a private (encrypted) page of memory, the VM must always read the value it last wrote.

Although these and other security features protect VMs from various attacks performed by malicious virtual machine managers, other VMs, and input/output (I/O) devices, these security features impart performance and functional limitations on the system. For example, many confidential computing environments virtualize and share I/O devices across multiple VMs using device interfaces. The device interfaces allow the I/O device to be virtualized as a different virtual I/O device for each VM. In many instances, the lifecycle of a device interface is not managed in a secure or trusted manner. As such, an I/O device and its interfaces are typically considered untrusted device and are not allowed to access the private memory the VM, which results in performance and functional issues associated with VM memory accesses.

To overcome the functional and performance limitations of typical VM security features described above, a processing system, using the techniques described herein, employs a security module (e.g., a security co-processor) to manage the lifecycle of device interfaces in such a way that enables the VMs to "trust" the device interfaces and their associated I/O device. Stated differently, the VMs are able to determine that the operations of the device interfaces are secure and unlikely to result in the exposure of confidential VM information. Therefore, one or more of the techniques described herein, relaxes the restriction that an I/O device and its interfaces cannot access VM private memory while maintaining the protection of VMs from malicious devices.

As described below, the lifecycle of a device interface comprises different phases, such as device initialization, binding, attestation, configuration, usage, unbinding, rebinding or reclaiming, and device tear down (de-initialization). During the binding phase, the system physical addresses (SPAs) of the memory mapped Input/Output (MMIO) ranges are mapped to guest physical addresses (GPAs) of a VM and the state of a device interface is transitioned from an unlocked state (e.g., device interface configuration can be changed/modified) to a locked state (e.g., device interface configuration cannot be changed/modified). The attestation phase includes attesting the I/O device and the device interface. For example, a VM is provided an attestation report and certificate chain for validating the configuration of the I/O device. The VM is also provided an interface report to validate the configuration, such as the MMIO range layout, of the device interface. The configuration phase includes configuring MMIO for use by the VM and configuring an input/output memory management unit (IOMMU). The usage phase includes the VM accessing the device interface and vice versa. The unbinding phase includes unbinding the device interface from the VM and recovering from any I/O device or VM error conditions. The unbound device interface can then be rebound to a VM or its resources, such as a context page, or the device interface can be reclaimed.

These phases and their processes of the device interface lifecycle, as governed by the security module, provide memory security, such as protection from malicious DMA, unexpected memory types, and unexpected memory mapped Input/Output (MMIO) access. I/O device assurance is also provided by implementing I/O device attestation operations, protecting I/O device configurations, and enabling the VMs to mediate device interface assignment. VMs can differ in their opinions on the trustworthiness of a device interface and can determine if a device interface is to be trusted based on, for example, attestation reports, certificate chains, and interface reports. Also, a VM can be bound to zero or more device interfaces, whereas a device interface can be bound to zero or one VM. Trusted channels are provided between I/O devices and VMs, which protects the VMs from physical attacks on traces and further provides protection from snooping or masquerading by a malicious machine manager. Also, performance is improved over conventional I/O virtualization environments by allowing DMA into guest private ranges, which eliminates costly bounce buffering.

FIG. 1 illustrates a processing system 100 that implements a lifecycle management process for device interfaces of I/O devices in accordance with some embodiments. The processing system 100 is generally configured to execute sets of instructions (e.g., computer programs) to carry out tasks on behalf of an electronic device. Accordingly, in different implementations the processing system 100 is part of any of a variety of electronic devices. For purposes of description, it is assumed that the processing system 100 is part of an electronic device that implements a confidential computing environment, such as a server. However, in other implementations, the processing system 100 is part of a desktop computer, laptop computer, tablet, game console, and the like.

To implement the confidential computing environment, and to execute the sets of instructions and corresponding operations, the processing system 100 includes a processor 102, a memory 104, and one or more input/output (I/O) devices, such as I/O device 106. In some implementations, the processor 102 is a general-purpose processor, such as a central processing unit (CPU) including hardware structures configured to retrieve and execute the sets of instructions. The memory 104 includes one or more memory devices configured to store and retrieve data based on commands (e.g., store and load commands) received from the processor 102. Accordingly, in different implementations the memory 104 is random access memory (RAM), non-volatile memory (NVM) or storage, and the like, or any combination thereof.

The I/O device 106 is any device that can, independent of the processor 102, process input information, output information, or a combination thereof on behalf of the processing system 100. For example, in some implementations the I/O device 106 is a network interface device that processes input and output information for a network (not shown) connected to the processing system 100. In other implementations, the I/O device 106 is a storage controller (e.g., a disc controller or non-volatile memory (NVM) storage controller), a controller associated with a user interface (e.g., a keyboard), and the like.

To execute the sets of instructions and corresponding operations, the processor 102 includes a processor core 108, a security module 110, and an input/output memory management unit (IOMMU) 112. It will be appreciated that in some implementations the processor 102 includes additional hardware to execute instructions, and to execute operations based on those instructions, such as additional processor cores, additional processing units (e.g., one or more graphics processing units), one or more controllers (e.g., memory controllers and input/output controllers), and the like.

The processor core 108 includes one or more instruction pipelines including a plurality of stages to execute instructions in a pipelined fashion. Thus, for example, in some implementations an instruction pipeline of the processor core 108 includes a fetch stage, a decode stage, a dispatch stage, one or more execution stages (with one or more corresponding execution units), a retire stage, and the like. The processor core 108 also includes, or has access to, memory structures and other hardware (not explicitly illustrated at FIG. 1) that support execution of instructions. For example, in some implementations the processor core 108 includes or has access to one or more cache structures to store data used for execution of the instructions.

The security module 110 is a set of hardware structures generally configured to create, monitor and maintain a security environment for the processor 102. For example, in at least some implementations the security module 110 is configured to manage the boot process for the processor 102, initialize security related mechanisms for the processor 102, and monitoring the processing system 100 for suspicious activity or events and implement an appropriate response. In some implementations the security module 110 includes a microcontroller, a cryptographic coprocessor (CCP) to encrypt and decrypt data, local memory and local registers to store, for example, cryptographic keys, and includes interfaces to interact with the memory 104, the I/O controller of the processor 102, and configuration registers of the processor 102. In some implementations, the security module 110 includes Environment Management Control hardware that performs environmental and security checking to ensure that the processor 102 is operating according to specified security parameters.

As noted above, the processing system 100 is generally configured to implement a confidential computing environment, and in particular to execute a plurality of virtual machines (VMs) (e.g., VM 114), also referred to as guests, and a hypervisor 116, also referred to as a host or a virtual machine manager, to manage execution of the plurality of VMs. Because the different VMs, and at least in some cases the hypervisor 116, are owned by different entities, the processing system 100 implements security features to protect the data of a given VM from access by other software, such as by another VM or by the hypervisor 116. For example, the processing system 100 implements data security for the VMs by implementing a secure region 118 of the memory 104 that stores encrypted data. In particular, the processor 102 is configured to encrypt specified data for each VM according to a corresponding private cryptographic key, and to store the encrypted data at the secure region 118. Because the data is encrypted, the data for one VM is protected from unauthorized access by other VMs and by the hypervisor 116. In at least some implementations, cryptographic keys for the VMs are managed by the security module 110, and data encryption and decryption for the VMs is executed by a dedicated hardware encryption/decryption module (not shown) at a memory controller (not shown) of the processor 102.

In at least some implementations, the confidential computing environment of the processing system 100 provides integrity guarantees by implementing a Reverse Map Table (RMP) 128. The RMP 128 is a single data structure shared across the system 100 and comprises one entry for every given memory page (e.g., 4k page) of memory that can be used by VMs 114. The RMP 128 tracks the owner for each page of memory. Pages of memory can be owned by the hypervisor 116, a specific VM 114, or by the security module 110. Access to memory is controlled so only the owner of that page can write it. The RMP 128, in at least some implementations, is used in conjunction with standard page tables to enforce memory restrictions and page access rights. In at least some implements, the processing system 100 also implements a Secure Device Table (SDT) 130 that encodes device interface VM bindings and security attributes. The SDT 130, in at least some implementations, is a store of the security attributes of device interfaces 120 of the I/O devices 106. For example, the SDT 130 includes a VM (guest) identifier of the VM 114 (guest) that the device interface 120 is bound to. The IOMMU 112 examines the SDT 130 when there is traffic from or to the device interface 120 to make a security policy decision whether the access is allowed or not allowed.

The confidential computing environment further implements I/O virtualization such that the I/O devices 106 are virtualized and shared across multiple VMs 114. For example, in some implementations, one or more I/O devices 106 are a physical I/O virtualization-capable device implementing one or more device interfaces 120 (illustrated as device interface 120-1 and device interface 120-2). Each device interface 120 allows the I/O device 106 to be virtualized as a different virtual I/O device for each VM 114. As used herein, a "device interface" refers to the unit of assignment for an I/O virtualization-capable device. In at least some implementations, a device interface is an entire (physical) I/O device, a non-I/O virtualization function, a virtual function (VF), or the like. One example of a device interface is a Trusted Execution Environment (TEE) device interface (TDI). The security module 110 binds a device interface 120 to a VM 114 by using a trusted and secure registration/binding process, such as a Trusted Execution Environment (TEE) Device Interface Secure Protocol (TDISP) process. For example, in some implementations the processing system 100 includes a communication fabric (not shown) that complies with a Peripheral Component Interconnect Express (PCIe) communication protocol. In particular, I/O devices such as I/O device 106, are configured to communicate with the processor 102, and the IOMMU 112, according to the PCIe communication protocol. In some implementations, the PCIe communication protocol establishes a TDISP security registration process for binding I/O devices to VMs, and the security module 110 uses the TDISP security registration process to bind I/O devices to executing VMs. In addition, the security module 110 assigns sets of memory addresses to respective executing VMs. The security module 110, in at least some implementations, programs a mapping table to store indications of the I/O devices bound to each VM, and the set of memory addresses assigned to each VM.

In many confidential computing environments, the lifecycle of a device interface 120 is not managed in a way that allows the VM 114 to trust the device interface 120. For example, in some confidential computing environments, a device interface is bound to a VM using an untrusted/unsecure registration process, the channel/session established between a device interface and a VM is unsecure, multiple device interfaces are bound to the same VM, or the like. As such, an I/O device and its device interfaces are generally considered untrusted by a VM, which typically imparts functional and performance limitations on the system, such as the I/O device and device interfaces being restricted from accessing private memory of the VM.

To overcome these functional and performance limitations, the security module 110 implements a process 126 for managing the lifecycle of device interfaces 120 in a secure and trusted manner, which allows the VMs 114 to trust the device interfaces 120 bound to the VMs 114 such that the device interfaces 120 can access the private memory of the VM 114 while still protecting the VM 114 from malicious devices. The security module 110 ensures that a given VM

114 is bound to zero or more device interfaces 120, and further ensure that a device interface 120 is bound to zero or one VM 114. Trusted channels are provided between I/O devices 106 and VMs 114, which protects the VMs 114 from physical attacks on traces, and protection from snooping or masquerading by a malicious machine manager is also provided.

After a device interface 120 is bound to and trusted by a VM 114 according to one or more of the techniques described herein, the device interface 120 is able to access memory 104 assigned to the VM. In at least some implementations, a device interface 120 accesses memory 104 assigned to a VM 114 by generating direct memory access (DMA) (e.g., DMA request 122) requests to read data from the memory 104, write data to the memory 104, or a combination thereof. The IOMMU 112 is configured to handle the DMA requests issued by I/O devices 106 or associated device interfaces 120. For example, to enhance processing efficiency, the IOMMU 112 is generally configured to perform specified memory access operations on behalf of the processor 102—that is, to perform memory access operations using dedicated hardware of the IOMMU 112, and without requiring management of the memory access operations by the processor 102. In particular, the IOMMU 112 includes dedicated hardware to perform DMA operations. In some implementations, each DMA request issued by a device interface 120 includes a descriptor indicating the virtual addresses of the data to be accessed—that is, the virtual address of the data to be read, the virtual address where data is to be written, or both. These virtual addresses indicate the region of the memory 104 that is targeted by the DMA request. The IOMMU 112 is generally configured to translate the virtual addresses indicated by a DMA request to physical addresses of the memory 104, and to interact with the memory 104 to carry out the one or more operations (read operations, write operations, or a combination thereof) indicated by the DMA request.

In at least some implementations, the processor core 108 accesses an I/O device 106 (or device interface 120) by issuing MMIO requests (e.g., MMIO 124) associated with a particular executing VM 114. Each MMIO request identifies a memory address from which data is to be read, a memory address to which data is to be written, or a combination thereof. For example, in some cases the processor core 108 programs a particular register of an I/O device 106 by issuing an MMIO request to write data to a memory address associated with the register. By using memory addresses to provide information to, or retrieve information from, an I/O device 106, the processor core 108 is able to interact with the I/O device 106 using a relatively simple set of access commands, and by leveraging at least some hardware used to access system memory, thereby improving overall efficiency of the processor core.

Figure 2:
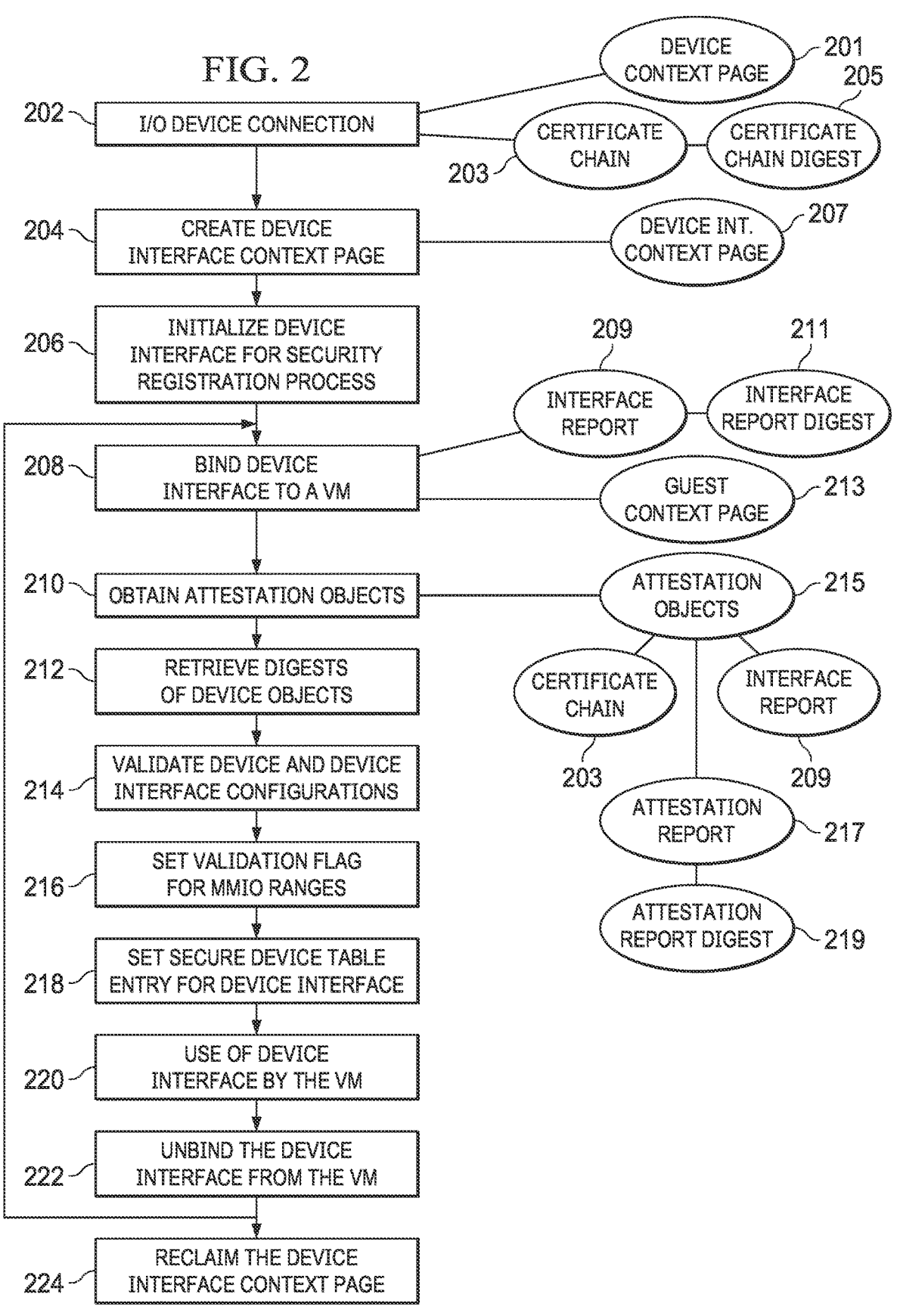
FIG. 2 and FIG. 3 together illustrate a flow diagram of a method for managing the lifecycle of the device interfaces in a secure and trusted manner in accordance with some embodiments.
Figure 3:
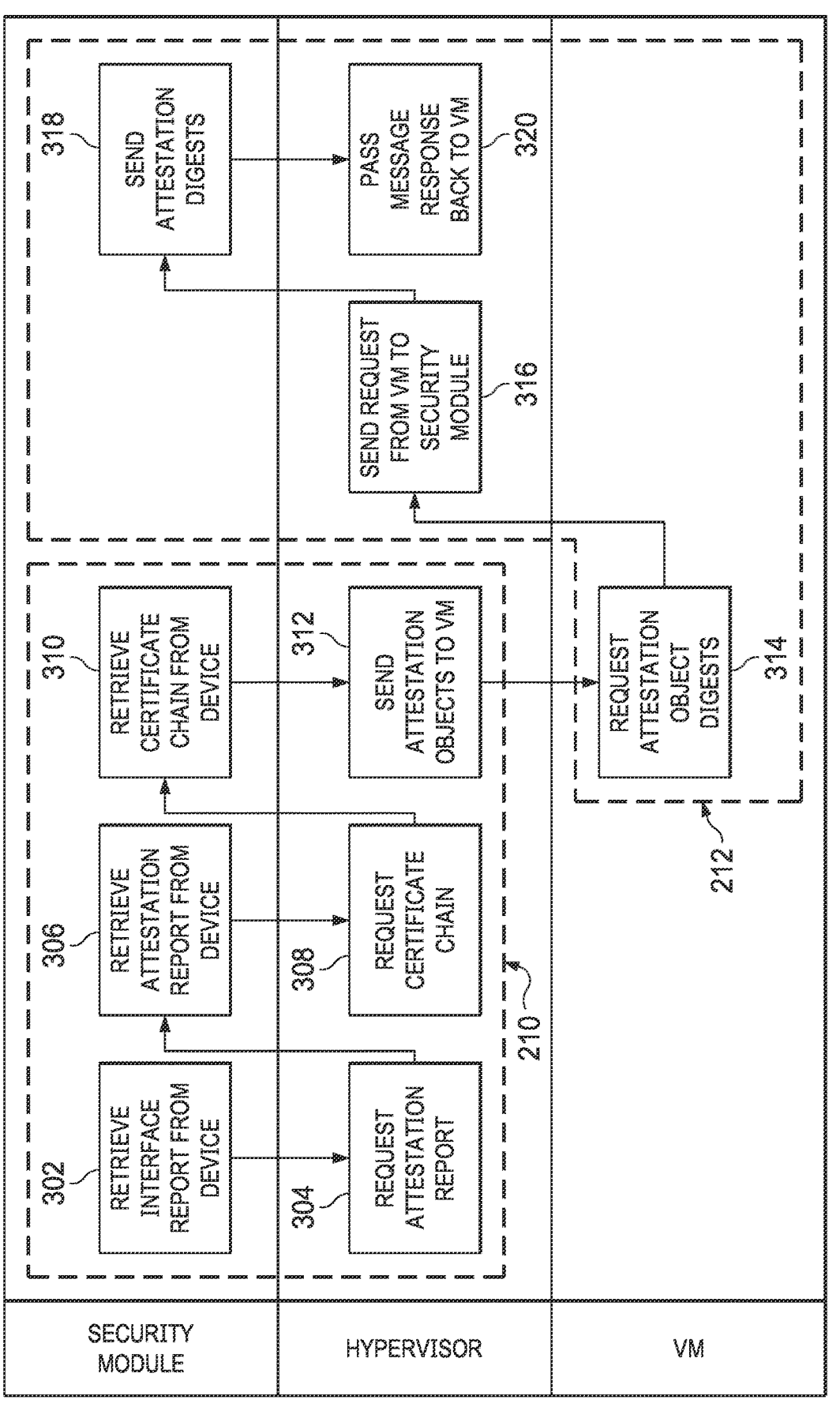

FIG. 2 and FIG. 3, in combination, illustrate a flow diagram of the process/method 126 implemented by the security module 110 for managing the lifecycle of device interfaces 120 in a confidential computing environment, such as a Trusted Execution Environment, implementing I/O virtualization. For purposes of description, the process 126 is described with respect to an example implementation at the processing system 100 of FIG. 1, but it will be appreciated that in other implementations the process 126 is implemented at processing systems having different configurations.

At block 202, an I/O device 106 is connected to the processor 102 or, for example, a System-on-Chip (SoC) comprising the processor 102. As part of the connection process, the hypervisor 116 allocates a portion (e.g., a page) of the system memory 104 to the security module 110 for use as a device context page 201. In at least some implementations, device context pages 201 are memory resources used by the security module 110 to track the I/O device 106 during the lifecycle management process 126. For example, in at least some implementations, device context pages 201 are immutable memory pages used by the security module 110 to identify individual I/O devices 106 and hold per-device data. Device context pages 201, in at least some implementations, are protected by the RMP 128. As part of the connection process, the security module 110 also establishes a secure connection, such as a Security Protocol and Data Model (SPDM) connection, with the I/O device 106 and also establishes a secure session, such as an SPDM session, with the I/O device 106. The secure connection refers the communication between the I/O device 106, the hypervisor 116, and the security module 110. The secure session refers to a secure communication channel for providing the SPDM connection. The security module 110, in at least some implementations, communicates with the hypervisor 116 to obtain the certificate chain of the I/O device 106. The security module 110 uses the certificate chain to establish the secure session with the I/O device 106. A digest 205 of the certificate chain 203 is stored in the device context page 201 of the I/O device 106. In at least some implementations, the security module 110 also negotiates and programs Integrity and Data Encryption streams for the I/O device 106. The security module 110, in at least some implementations, stores secure connection and secure session information in the device context page 201.

At block 204, the security module 110 creates a context page 207 for one or more device interfaces 120 of the I/O device 106. In at least some implementations, device interface context pages 207 are memory resources used by the security module 110 to track the device interface 120 during the lifecycle management process 126. For example, the hypervisor 116 allocates a portion (e.g., a page) of the system memory 104 to the security module 110 for use as a device interface context page 207. In at least some implementations, device interface context pages 207 are immutable memory pages and protected by the RMP 128. Device interface context pages 207 are used by the security module 110 to identify individual device interfaces 120 and hold per-device interface data, such as the interface identifier (ID) of the device interface 120. The device interface context page 207, in at least some implementations, includes state information (e.g., CONFIG_ULOCKED, CONFIG_LOCKED, RUN, ERROR, etc.) for the device interface 120, points to the device context page 201 of its I/O device 106, points to zero or one (bound) guest context pages 213. In at least some implementations, the device interface context pages 207 have SPA pointers to one another in a linked list. Each time a device interface context page 207 is created, the security module 110 adds the context page to the linked list. The device context page 201 holds head of the list. This allows the security module 110 to determine if other device interface context pages 207 exist before reclaiming the device context page 201, and also allows the security module 110 to determine that no two existing device interface context pages 207 represent the same device interface 120.

At block 206, the security module 110 initializes one or more device interfaces 120 of the I/O device 106 for a security registration process. At block 208, the security module 110 manages the binding of the device interface 120 to a VM 114. During the binding process, the security module 110 ensures that a given VM 114 is bound to zero or more device interfaces 120, and further ensures that a device interface 120 is bound to zero or one VM 114. In at least some implementations, the security module 110 binds a device interface 120 to a VM 114 using a TDISP process in response to receiving a binding command or request from the hypervisor 116. As part of the binding process, the hypervisor 116 maps MMIO ranges associated with the device interface 120 to GPAs of the VM 114, and further provides a unique ID that is used by the VM 114 to identify the device interface 120 in VM messages sent between the VM 114 and hypervisor 116 or VM 114 and security module 110. The security module 110 checks that the device interface 120 is not already bound to another VM 114. If so, the security module 110 does not allow the device interface 120 to be bound to the current VM 114. The security module 110 also checks that the ID assigned by the hypervisor 116 to the device interface 120 is not already in use by another device interface 120 bound to the current VM 114. If the device interface 120 is currently unbound and the ID assigned to the device interface 120 is unique for the current VM 114, the security module 110 proceeds to transition the device interface 120 to a CONFIG_LOCKED state. At this point in the lifecycle of the device interface 120, the device interface 120 is unable to change its configuration.

In at least some implementations, the security module 110 communicates with the device interface 120, or at least the hypervisor 116, to obtain an interface report 209 from the I/O device 106 for the device interface 120. The interface report 209 includes information related to the current configuration of the device interface 120, such as the MMIO ranges associated with device interface 120, device specific information, capabilities if the device interface 120 (e.g., Address Translation Service (ATS)), security configurations of the device interface 120, security attributes per MMIO range (e.g., whether the MMIO range is allowed to be shared (accessible by both the VM 114 and hypervisor 116) or is to be private, and the like. The security module 110 measures the interface report 209 and then returns the interface report 209 to the hypervisor 116. The security module 110 measures the interface report 209, in at least some implementations, by calculating a digest using a cryptographic hash algorithm on the entirety of the interface report 209. In at least some implementations, the security module 110 stores a digest 211 of the interface report 209 in the context page 201 of the device interface 120. The security module 110, uses the interface report 209 to check that the memory pages comprising the MMIO ranges meet one or more conditions, such as the range being entirely MMIO addresses, any private MMIO range being in a pre-guest RMP page state and owned by the VM 114, any non-private memory page being in a hypervisor page state, or the like. In at least some implementations, a pre-guest RMP page state indicates that the page the MMIO range is mapped into is assigned to the VM 114 and is frozen so that the security module 110 can operate on it. If the security module 110 determines that the memory pages comprising the MMIO ranges satisfy the one or more conditions, the security module 110 transitions the device interface 120 to a RUN state, which indicates that the device interface 120 is bound and accessible to the VM 114. Otherwise, the binding process fails and the device interface 120 is not bound to the VM 114. If the binding process is successful, the security module 110 registers the context page 207 of the device interface 120 with a guest context page 213 of the VM 114. Guest context pages 213, in at least some implementations, are immutable memory pages and protected by the RMP 128. Guest context pages 213 are used by the security module 110 to identify individual VMs 114 and hold per-VM data.

At block 210, the security module 110 obtains attestation information or objects 215 associated with the bound device interface 120 in response to, for example, receiving a command or request from the hypervisor 116. Examples of attestation objects 215 include the interface report 209, the certificate chain 219 of the I/O device 106, an attestation report 217, and the like. At block 212, the VM 114 obtains the digests of one or more of the attestation objects 215. FIG. 3 shows a more detailed flow for the processes performed at block 210 and block 212 of FIG. 2. At block 302, the security module 110 obtains the interface report 209 from the I/O device 106. In at least some implementations, the security module 110 obtains and measures the interface report 209 as part of the binding process described above with respect to block 208. At block 304, the hypervisor 116 sends a request or command to the security module 110 for obtaining an attestation report 217 from the I/O device 106. At block 306, responsive to receiving the request from the hypervisor 116, the security module 110 communicates with the I/O device 106 to obtain the device attestation report 217. The attestation report 217 includes information, such as cryptographic digests of the firmware running on the I/O device 106, a description of security-related configurations of the I/O device, and the like, for validating and authenticating the configuration of the I/O device 106. Stated differently, the attestation report 217 includes information that allows the VM 114 to determine if the device interfaces 120 is trustworthy and configured in such a way that the security of the VM 114 would not be violated if the device interface 120 accessed the private memory of the VM 114. The security module 110 measures the attestation report 217 and sends the report to the hypervisor 116. The security module 110, in at least some implementations, stores a digest 221 of the attestation report in the context page 201 of the I/O device 106.

At block 308, the hypervisor 116 sends a request or command to the security module 110 for obtaining the certificate chain 203 from the I/O device 106 used to establish the secure session. At block 310, responsive to receiving the request from the hypervisor 116, the security module 110 communicates with the I/O device 106 to obtain the certificate chain 203. The certificate chain 203 includes information for authenticating the I/O device 106 and validating the configuration of the I/O device 106. For example, the certificate chain 203 includes a sequence of certificates. Each certificate is comprised of a public key, metadata about the owner of that public key, and a signature by another key over the public key and metadata. The certificate chain 213 connects the key used to sign the attestation report 207 and to build a Security Protocol and Data Model secure channel with the manufacturer of the I/O device 106. The security module 110 measures the certificate chain 203 and sends the certificate chain 203 to the hypervisor 116. At block 312, the hypervisor 116 sends the attestation objects 215 (e.g., the, the certificate chain 203, interface report 209, the attestation report 217, and the like) to the VM 114 so that the VM 114 can validate the configuration of the I/O device 106 and the configuration of the device interface 120. At block 314, the VM 114 sends a request for the digests to the hypervisor 116 at block 314. At block 316, the hypervisor 116 sends the request from the VM 114 to the security module 110. At block 318, the security module 110 retrieves the digests from, for example, the context page 201 of the I/O device 106 and the context page 207 of the device interface 120 and sends the digests to the hypervisor 116. At block 320, the hypervisor 116 sends the message from the security module 110 including the digests to the VM 114.

Returning to FIG. 2, at block 214, the VM 114 validates the configuration of the I/O device 106 and the configuration of the device interface 120. Based on this validation process, the VM 114 makes a determination whether it trusts the I/O device 106 or device interface 120. In at least some implementations, different VMs 114 can have different opinions on the trustworthiness of a given I/O device 106 or a bound device interface 120. Each VM 114 makes its own decision whether to trust or not trust the I/O device 106 or a bound device interface 120. In at least some implementations, the VM 114 uses the digests to validate the attestation objects received from the hypervisor 116. Stated differently, the VM 114 uses the digests to determine if the hypervisor 116 altered the attestation objects 215. For example, the VM 114 uses the digest 205 of the certificate chain 203 to validate the signatures of the certificate 203 and to ensure the VM 114 trusts the root Certificate Authority (CA). In another example, the VM 114 uses the digests 219 of the attestation report 217 to ensure that the measurements included in the attestation report 217 match the measurements expected by the VM 114. In a further example, the VM 114 uses the digests 211 of the interface report 209 to ensure the report 209 and the hypervisor's statement of where the MMIO ranges are in agreement. The VM 114 can also validate security attributes of MMIO ranges and device specific information. If the VM 114 determines that it cannot trust either the I/O device 106 or the device interface 120, the VM 114 provides an indication to the hypervisor 116 or the security module 110 that either or both of the I/O device 106 or the device interface 120 are untrusted. The security module 110 then determines that an error condition has occurred and performs one or more operations, such as unbinding the device interface 120 from the VM 114 or takes another security action. Otherwise, the process continues to block 216.

At block 216, MMIO validation is performed based on the interface report 209 and the mapping of the MMIO ranges to GPAs. At this point in the device interface lifecycle, MMIO access is prevented by the RMP 128 until the MMIO ranges are validated. In at least some implementations, the interface report 209 enumerates all MMIO ranges in the System Physical Address (SPA) space. The interface report 209 also reports MMIO range security attributes. During the binding process described above with respect to block 208, the hypervisor 116 translates each MMIO SPA to GPA using the RMP 128. The security module 110 performs validation checks for each MMIO range. For example, the security module 110 ensures that an MMIO range is assigned to a VM 114 in the RMP 128 and that an MMIO range is contiguous in GPA space. The security module 110 also ensures that an MMIO range includes the complete range and is in the Pre-Guest page state. The VM 114 also performs validation checks for each MMIO in the interface report as well. For example, the VM 114 ensures that the MMIO ranges assigned by the hypervisor 116 and MMIO ranges in the interface report 209 are in agreement. The VM 114 also ensures that MMIO ranges do not overlap existing validated MMIO ranges. If the MMIO ranges are determined to be invalid, an error condition occurs and the security module 110 unbinds the device interface 120 from the VM 114. Otherwise, if the MMIO ranges are determined to be valid, the VM 114 sends a request to the security module 110 and the security module 10 marks the MMIO ranges as validated for the VM 114. In at least some implementations, the VM 114 can only access an MMIO range after it has been set as validated.

At block 218, the VM 114 sends a request to security module 110 to add an entry to the SDT 130 for the device interface 120. At this point in device interface lifecycle, DMA is prevented by the IOMMU until the entry is added to the SDT for the device interface 120. Responsive to receiving this request, the security module 110 creates an entry in the SDT 130 for the device interface 120. The entry encodes the binding of the device interface 120 to the VM 114 and also encodes security attributes for the binding. As such, at block 218, the VM 114 is essentially requesting the security module 110 to start allowing the IOMMU 112 to allow device access to VM memory. At block 220, the VM 114 uses the I/O device 106 and vice versa. For example, the VM 114 access the I/O device 106 by issuing MMIO requests and the device interface 120 accesses the VM 114 by issuing DMA requests. At block 222, the security module 110 unbinds the device interface 120 from the VM 114. For example, the security module 110 checks that all pages of the MMIO ranges of the device interface 120 are no longer assigned to the VM 114. The security module 110 then transitions the device interface 120 to the CONFIG_UN-LOCKED state. The security module 110 also unregisters the context page 207 of the device interface 120 from the context page 213 of the VM 114. Once unbound, the device interface 120 can be bound to the same VM 114 or a different VM 114. At block 224, the security module 110 reclaims the context page 207 of the device interface 120. Alternatively, if the device interface 120 is to not be bound again, the security module 110 reclaims the context page 207 of the device interface 120. For example, the security module 110 checks the device interface 120 is no longer bound to a VM 114. The security module 110 unregisters the context page 207 of the device interface 120 from the context page 201 of its I/O device 106. Then, the security module 110 transitions the context page 207 of the device interface 120 to a Reclaim page state.

As such, the process 126 implemented by the security module 110 for managing the lifecycle of device interfaces 120 ensures a trusted environment that allows a VM 114 to assume that the operations of the device interfaces 120 are secure and unlikely to result in the exposure of confidential VM information. The process 126 described above also allows for trusted channels to be provided between I/O devices 106 and VMs 114, which protects the VMs 114 from physical attacks on traces, and further provides protection from snooping or masquerading by a malicious hypervisor.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:
   binding a device interface of an input/output (I/O) device within a virtualization environment to a virtual machine (VM);
   responsive to binding the device interface, attesting at least one of the device interface and the I/O device; and
   responsive to attesting the at least one of the device interface or the I/O device, configuring an input-output memory management unit (IOMMU) by creating an entry in a secure device table examined by the IOMMU during processing of memory access requests.

2. The method of claim 1, further comprising:
unbinding the device interface from the VM.

3. The method of claim 2, further comprising:
responsive to unbinding the device interface from the VM, binding the device interface to another VM.

4. The method of claim 2, further comprising:
responsive to unbinding of device interface from the VM, reclaiming a memory resource associated with the device interface, wherein the memory resource is used to track a device interface during its lifecycle.

5. The method of claim 1, wherein binding the device interface comprises:
mapping memory mapped I/O (MMIO) ranges associated with the device interface to guest physical addresses (GPAs) of the VM.

6. The method of claim 1, wherein binding the device interface further comprises:
transitioning the device interface from a first state that allows a configuration of the device interface to be changed to a second state, the second state locking the configuration and allowing the VM to access the device interface.

7. The method of claim 1, wherein attesting the at least one of the device interface or the I/O device comprises:
providing the VM with one or more of an attestation report or a certificate chain associated with the I/O device; and
providing the VM with an interface report associated with the device interface.

8. The method of claim 7, wherein attesting the at least one of the device interface or the I/O device further comprises:
responsive to providing the one or more of the attestation report or the certificate chain, determining that a configuration of the I/O device is valid; and
responsive to providing the interface report, determining that a configuration of the device interface is valid.

9. The method of claim 8, wherein determining that the configuration of the device interface is valid comprises determining that memory mapped I/O (MMIO) ranges identified in the interface report match MMIO ranges assigned by a hypervisor to the VM.

10. The method of claim 8, wherein the IOMMU is configured in response to determining that the configuration of the I/O device and the configuration of the device interface are valid.

11. The method of claim 8, further comprising unbinding the device interface from the VM in response to at least one of determining that a configuration of the I/O device is invalid based on the attestation report or the certificate chain, or determining that a configuration of the device interface is invalid based on the interface report.

12. The method of claim 1, further comprising:
responsive to attesting the at least one of the device interface or the I/O device, configuring memory resources associated with the VM by setting MMIO ranges assigned to the VM by a hypervisor as valid.

13. The method of claim 1, wherein the entry binds the device interface to the VM and encodes security attributes governing access by the device interface with the VM.

14. A method comprising:
binding a device interface of an input/output (I/O) device within a virtualization environment to a virtual machine (VM);
responsive to binding the device interface, providing attestation information associated with at least one of the device interface and the I/O device to the VM;
responsive to providing the attestation information, receiving an indication from the VM that one or more of the device interface or the I/O device are untrusted; and
responsive to receiving the indication, unbinding the device interface from the VM, including removing an entry corresponding to the device interface from a secure device table examined by the IOMMU during processing of memory access requests.

15. The method of claim 14, wherein providing the attestation information comprises:
providing the VM with one or more of an attestation report or a certificate chain associated with the I/O device; and
providing the VM with an interface report associated with the device interface.

16. The method of claim 15, wherein providing the attestation information further comprises:
providing the VM with one or more of digest of the attestation report or a digest of the certificate chain; and
providing the VM with a digest of the interface report.

17. The method of claim 16, wherein the indication received from the VM is based on a comparison of one or more of the digest of the attestation report to the attestation report, the digest of the certificate chain to the certificate chain, or the digest of the interface report to the interface report.

18. A processor comprising:
a security co-processor configured to:
bind a device interface of an input/output (I/O) device within a virtualization environment to a virtual machine (VM);
responsive to the device interface being bound, attest at least one of the device interface and the I/O device; and
responsive to the at least one of the device interface or the I/O device being attested,
configure an input-output memory management unit (IOMMU) by creating an entry in a secure device table examined by the IOMMU during processing of memory access requests.

19. The processor of claim 18, wherein the security co-processor is further configured to
unbind the device interface from the VM.

20. The processor of claim 18, wherein the security co-processor is configured to attest the at least one of the device interface or the I/O device by:
providing the VM with one or more of an attestation report or a certificate chain associated with the I/O device; and
providing the VM with an interface report associated with the device interface.

21. A processor comprising:
a security co-processor configured to:
bind a device interface of an input/output (I/O) device within a virtualization environment to a virtual machine (VM);
responsive to the device interface being bound to the VM, provide attestation information associated with at least one of the device interface and the I/O device to the VM;

responsive to the attestation information being provided, receive an indication from the VM that one or more of the device interface or the I/O device are untrusted; and responsive to the indication, unbind the device interface from the VM, including removing an entry corresponding to the device interface from a secure device table examined by the IOMMU during processing of memory access requests.

22. The processor of claim 21, wherein the security co-processor is configured to provide the attestation information by:

providing the VM with one or more of an attestation report or a certificate chain associated with the I/O device; and providing the VM with an interface report associated with the device interface.

23. The processor of claim 22, wherein the security co-processor is further configured to provide the attestation information by:

providing the VM with one or more of digest of the attestation report or a digest of the certificate chain; and providing the VM with a digest of the interface report.

24. The processor of claim 23, wherein the indication received from the VM is based on a comparison of one or more of the digest of the attestation report to the attestation report, the digest of the certificate chain to the certificate chain, or the digest of the interface report to the interface report.

\* \* \* \* \*